(12) United States Patent
Xin et al.

(10) Patent No.: US 11,329,854 B2
(45) Date of Patent: May 10, 2022

(54) DATA MODULATION METHOD AND APPARATUS

(71) Applicant: XI'AN ZHONGXING NEW SOFTWARE CO., LTD., Shaanxi (CN)

(72) Inventors: Yu Xin, Shenzhen (CN); Luanjian Bian, Shenzhen (CN); Guanghui Yu, Shenzhen (CN); Jin Xu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/263,398

(22) PCT Filed: Jul. 26, 2019

(86) PCT No.: PCT/CN2019/097845
§ 371 (c)(1),
(2) Date: Jan. 26, 2021

(87) PCT Pub. No.: WO2020/020330
PCT Pub. Date: Jan. 30, 2020

(65) Prior Publication Data
US 2021/0160116 A1    May 27, 2021

(30) Foreign Application Priority Data
Jul. 26, 2018   (CN) .......................... 201810834174.6

(51) Int. Cl.
*H04L 27/26*    (2006.01)
(52) U.S. Cl.
CPC ................. *H04L 27/2627* (2013.01)

(58) Field of Classification Search
CPC . H04L 27/12; H04L 27/2601; H04L 27/2614; H04L 27/2697; H04L 27/362;
(Continued)

(56) References Cited

U.S. PATENT DOCUMENTS 6,130,918 A * 10/2000 Humphrey .......... H04L 27/2614
375/285
8,165,232 B2    4/2012 Moffatt et al.
(Continued)

FOREIGN PATENT DOCUMENTS

| CN | 102273158 | 12/2011 |
| CN | 103797718 | 5/2014 |

(Continued)

OTHER PUBLICATIONS

International Search Report Form PCT/ISA/210, and Written Opinion Form PCT/ISA/237, International Application No. PCT/CN2019/097845, pp. 1-5 International Filing Date Jul. 26, 2019 mailing date of search report dated Oct. 16, 2019.

(Continued)

*Primary Examiner* — Khanh C Tran
(74) *Attorney, Agent, or Firm* — Bond Schoeneck & King, PLLC; George McGuire

(57) ABSTRACT

Provided are a data modulation method and apparatus, and a storage medium. The method includes: modulating a first data sequence to obtain a second data sequence; inserting a third data sequence into the second data sequence to obtain a fourth data sequence, where each of data, except for a first one and a last one in the fourth data sequence, of the third data sequence in the fourth data sequence satisfies that power of the each datum is equal to average power of two data adjacent to the each datum, and a phase of the each datum is within an angle between the two data adjacent to the each datum; and transmitting the fourth data sequence.

20 Claims, 8 Drawing Sheets

(58) Field of Classification Search
CPC ............. H04L 27/2624; H04L 27/2627; H04L 27/3411
See application file for complete search history.

(56) References Cited

U.S. PATENT DOCUMENTS

| | | | |
|---|---|---|---|
| 9,083,431 | B2 | 7/2015 | Nishikawa |
| 10,757,450 | B2* | 8/2020 | Jia .......................... H03M 3/04 |
| 2009/0196359 | A1 | 8/2009 | Magee |
| 2010/0165829 | A1 | 7/2010 | Narasimha et al. |
| 2011/0206207 | A1* | 8/2011 | Priotti ................. H04L 27/2621 380/287 |
| 2013/0188631 | A1 | 7/2013 | Nishikawa |
| 2017/0279648 | A1 | 9/2017 | Song et al. |
| 2020/0287765 | A1* | 9/2020 | Xin ......................... H04L 27/26 |

FOREIGN PATENT DOCUMENTS

| | | |
|---|---|---|
| CN | 103797718 A | 5/2017 |
| CN | 107896206 A | 4/2018 |
| EP | 2905906 A1 | 8/2015 |
| WO | 2014/091198 | 6/2014 |

OTHER PUBLICATIONS

Translated Chinese First Office Action, dated Nov. 16, 2021. Pages 1-11.
Translated Chinese First Search Report, pp. 1-2.
European Search Report of PCT/CN2019/097845, dated Mar. 23, 2022, pp. 1-10.
Iith et al: "Performance of FPO and OFDM with PA model and windowing", 3GPP Draft; R1-165422, 3rd Generation Partnership Project (3GPP).
Ericsson: NB-IoT—SC-FDMA UL specttrum characteristics, PAPR, and relative cibic metric 3GPP Draft; R1-15766.

* cited by examiner

DATA MODULATION METHOD AND APPARATUS

CROSS-REFERENCE TO RELATED APPLICATIONS

This is a National Stage Application, filed under 35 U.S.C. 371, of International Patent Application No. PCT/CN2019/097845, filed on Jul. 26, 2019, which claims priority to Chinese Patent Application No. 201810834174.6 filed with the CNIPA on Jul. 26, 2018, the disclosures of which are incorporated herein by reference in their entireties.

TECHNICAL FIELD

The present application relates to, but is not limited to, the field of coding and modulation and, in particular, relates to a data modulation method and apparatus.

BACKGROUND

In high frequency scenarios, due to relatively large path losses and shadow fading, some areas at the edge of a cell have a very low signal-to-noise ratio. Moreover, a power amplifier (PA) has relatively low efficiency at a high frequency. To improve the signal-to-noise ratio and save the power consumption of a battery in a UE, the UE needs to transmit a signal with a relatively low peak-to-average power ratio (PAPR).

In a large-scale Internet of Things scenario, also known as massive machine-type communications (mMTC) scenario, some terminal devices expect to save the power consumption of the battery to a great extent, for example, the service life of the battery is expected to reach more than ten years. Therefore, to improve the PA efficiency of the UE, the UE needs to transmit the signal with a relatively low PAPR. Especially in the case of non-orthogonal access of a large number of users, a signal-to-interference-plus-noise ratio (SINR) will be very low. Therefore, there is a need to adopt a signal modulation method with a low modulation and coding scheme (MCS) and a low PAPR.

In summary, the communication signal still has a relatively high PAPR, which is difficult to satisfy the requirement for the lower PAPR in some communication scenarios (such as the mMTC scenario). Therefore, it is necessary to design a signal modulation method with the lower PAPR. In other words, it is necessary to design a modulation technology to further reduce the PAPR. However, no effective scheme has yet been proposed.

SUMMARY

The present application provides a data modulation method and apparatus, and a computer storage medium.

The present application provides a data modulation method. The method includes steps described below. a first data sequence is modulated to obtain a second data sequence; a third data sequence is inserted into the second data sequence to obtain a fourth data sequence, where each of data, except for a first one and a last one in the fourth data sequence, of the third data sequence inserted in the fourth data sequence satisfies that power of the each datum is equal to average power of two data adjacent to the each datum, and a phase of the each datum is within an angle between the two data adjacent to the each datum; and the fourth data sequence is transmitted.

The present application provides a data modulation method. The method includes a step in which a data sequence $[b(i)]$ is modulated to obtain a data sequence $[s(k)]$, where $[s(k)]$ has the following characteristics: all $s(k)$ have a same modulus, and $s(2i+2)/s(2i+1)-s(2i+1)/s(2i)=0$, where i and k are non-negative integers.

The present application provides a data modulation apparatus. The apparatus includes a modulation unit, an insertion unit and a transmission unit. The modulation unit is configured to modulate a first data sequence to obtain a second data sequence. The insertion unit is configured to insert a third data sequence into the second data sequence to obtain a fourth data sequence; where each of data, except for a first one and a last one in the fourth data sequence, of the third data sequence inserted in the fourth data sequence satisfies that power of the each datum is equal to average power of two data adjacent to the each datum, and a phase of the each datum is within an angle between the two data adjacent to the each datum. The transmission unit is configured to transmit the fourth data sequence.

The present application provides a data modulation apparatus. The apparatus includes a modulation unit which is configured to modulate a data sequence $[b(i)]$ to obtain a data sequence $[s(k)]$, where $[s(k)]$ has the following characteristics: all $s(k)$ have a same modulus, and $s(2i+2)/s(2i+1)-s(2i+1)/s(2i)=0$, where i and k are non-negative integers.

The present application provides a data modulation apparatus. The apparatus includes a memory storing a computer program and a processor which is configured to, when executing the computer program, implement the steps of the method in the preceding scheme.

The present application provides a computer storage medium storing a computer program, when the computer program is executed by a processor to implement the steps of the method in the preceding schemes.

In the schemes of the present application, the first data sequence is modulated to obtain the second data sequence; the third data sequence is inserted into the second data sequence to obtain the fourth data sequence; where each of data, except for the first one and the last one in the fourth data sequence, of the third data sequence inserted in the fourth data sequence satisfies that the power of the each datum is equal to the average power of the two data adjacent to the each datum, and the phase of the each datum is within the angle between the two data adjacent to the each datum; and the fourth data sequence is transmitted. A signal modulation method in which a datum is inserted between two adjacent modulated data is adopted, so that a phase difference between adjacent data in the time domain can be effectively reduced, thereby significantly reducing the PAPR.

BRIEF DESCRIPTION OF DRAWINGS

The drawings generally illustrate various embodiments discussed herein by way of examples rather than limitations.

DETAILED DESCRIPTION

Figure 1:
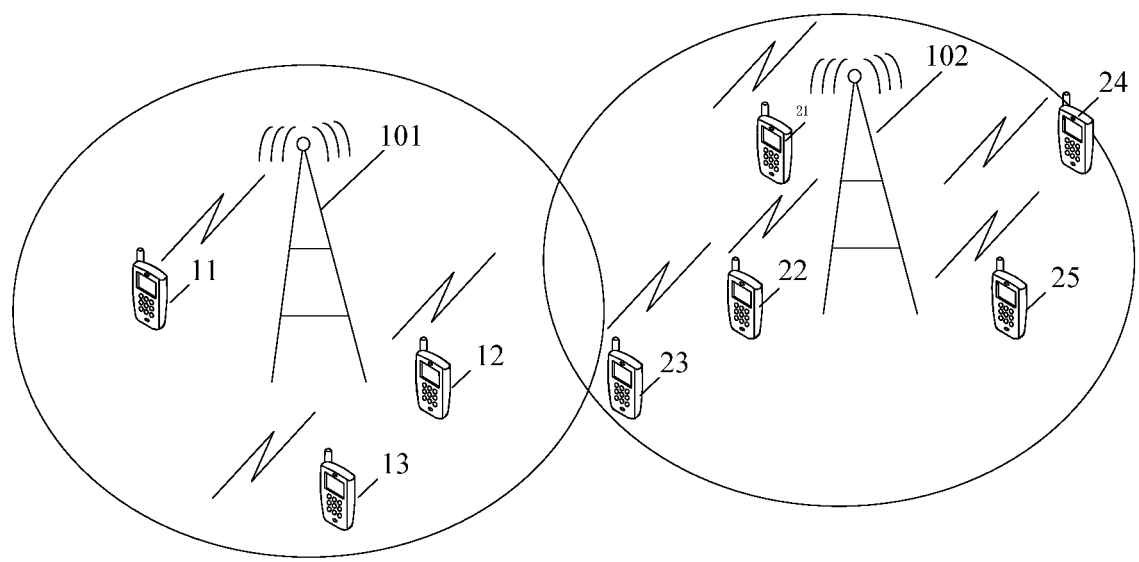
FIG. 1 is a schematic diagram of an application scenario according to an embodiment of the present application.

The present application will be further described in detail below in conjunction with the drawings and embodiments. It is to be understood that the embodiments described herein are merely intended to explain the present application and not to limit the present application. In addition, the embodiments described below are some embodiments for implementing the present application rather than all embodiments for implementing the present application. If not in conflict, the schemes in the embodiments of the present application may be combined in any way for implementation.

It is to be noted that in the embodiments of the present application, the term "comprising", "including" or any other variant thereof is intended to encompass a non-exclusive inclusion so that a method or an apparatus that includes a series of elements not only includes the expressly listed elements but also includes other elements that are not expressly listed or elements that are inherent for implementing the method or the apparatus. In the absence of more restrictions, the elements defined by the statement "including a . . . " do not exclude the presence of additional relevant elements in the method or the apparatus that includes the elements (for example, steps in the method or units in the apparatus, where the units may be part of circuits, part of processors, part of programs or software or the like).

For example, a data modulation method provided by the embodiments of the present application includes a series of steps, but the data modulation method provided by the embodiments of the present application is not limited to the steps described herein. Similarly, a data modulation apparatus provided by the embodiments of the present application includes a series of units, but the data modulation apparatus provided by the embodiments of the present application includes not only the units expressly listed but also the units to be provided for acquiring relevant information or perform processing based on information.

It is to be noted that the terms "first/second/third/fourth" involved in the embodiments of the present application are merely intended to distinguish between similar objects and not to represent a particular sequence of objects. Understandably, the terms "first/second/third/fourth" are interchangeable when allowed instead of representing the particular order or sequence. It is to be understood that the objects distinguished by the terms "first/second/third/fourth" are interchangeable where appropriate so that the embodiments of the present application described herein may be implemented in a sequence other than those shown or described herein.

Before the embodiments of the present application are further described in detail, the key technical terms involved in the embodiments of the present application are explained below.

| Acronym | Full Name | Chinese Translation |
|---|---|---|
| PAPR | Peak average power ratio | 峰均比 |
| BPSK | Binary phase shift keying | 二进制相移键控 |
| QPSK | Quadrature phase shift keying | 正交相移键控 |
| QAM | Quadrature amplitude modulation | 正交幅度调制 |

An application scenario of the data modulation method of the present application, as shown in FIG. 1, base stations 101 and 102 are included, where three terminals 11 to 13 exist within a cell coverage range of the base station 101, and five terminals 21 to 25 exist within a cell coverage range of the base station 102. The terminal may be a mobile phone as shown in FIG. 1 or various Internet of Things terminals in an mMTC scenario. In high frequency scenarios, all terminals have relatively large path losses and shadow fading when communicating with the base stations. In some areas at the edge of a cell, for example, terminal 13 at the edge of the cell coverage range of base station 101 has a very low signal-to-noise ratio. When it is expected to improve the signal-to-noise ratio and significantly save the power consumption of a battery, for example, a service life of the battery is expected to reach more than ten years, a UE needs to transmit a signal with a lower PAPR. That is to say, to improve the PA efficiency of the terminal, the UE needs to transmit a signal with a relatively low PAPR. Through the embodiments of the present application, a first data sequence [b(0), b(1), b(m), b(M−1)] is modulated, where M is the number of elements in the sequence, and m is an element serial number and an integer between 0 and M−1. For convenience of description, the sequence [b(0), b(1), b(m), b(M−1)] is simply expressed as [b(m)] in the present application. Similarly, other sequences in the present application are also simply expressed likewise. The sequence [b(m)] may be composed of 0 and 1 or composed of 1 and −1. [b(m)] may be modulated by means of a constellation point modulation, so that a second data sequence [x(i)] may be obtained after the modulation. A third data sequence [y(j)] is inserted into [x(i)] in a way that data are inserted between all pairs of adjacent data in [x(i)] or part of pairs of adjacent data in [x(i)], so that a fourth data sequence [s(k)] is obtained. In [s(k)], each of data, except for a first one and a last one, of the third data sequence inserted in the fourth data sequence satisfies that power of the each datum is equal to average power of two data adjacent to the each datum, and a phase of the each datum is within an angle between the two data adjacent to the each datum. After coding and modulation, [s(k)] carried on a physical time-frequency resource is transmitted. Of course, the first one and the last one of data may each satisfy that the power of one datum is equal to the average power of two data adjacent to the one datum, and the phase of the one datum is within the angle between the two data adjacent to the one datum from the perspective of [s(k)] connected end to end. The present application does not impose requirements on the first one and the last one of data. Since each inserted datum has a phase within an angle between two adjacent modulated data, and the each inserted datum has a same value of angles respectively with the two modulated data, therefore, a phase difference between adjacent data in the time domain can be effectively reduced, thereby significantly reducing the PAPR.

Figure 2:
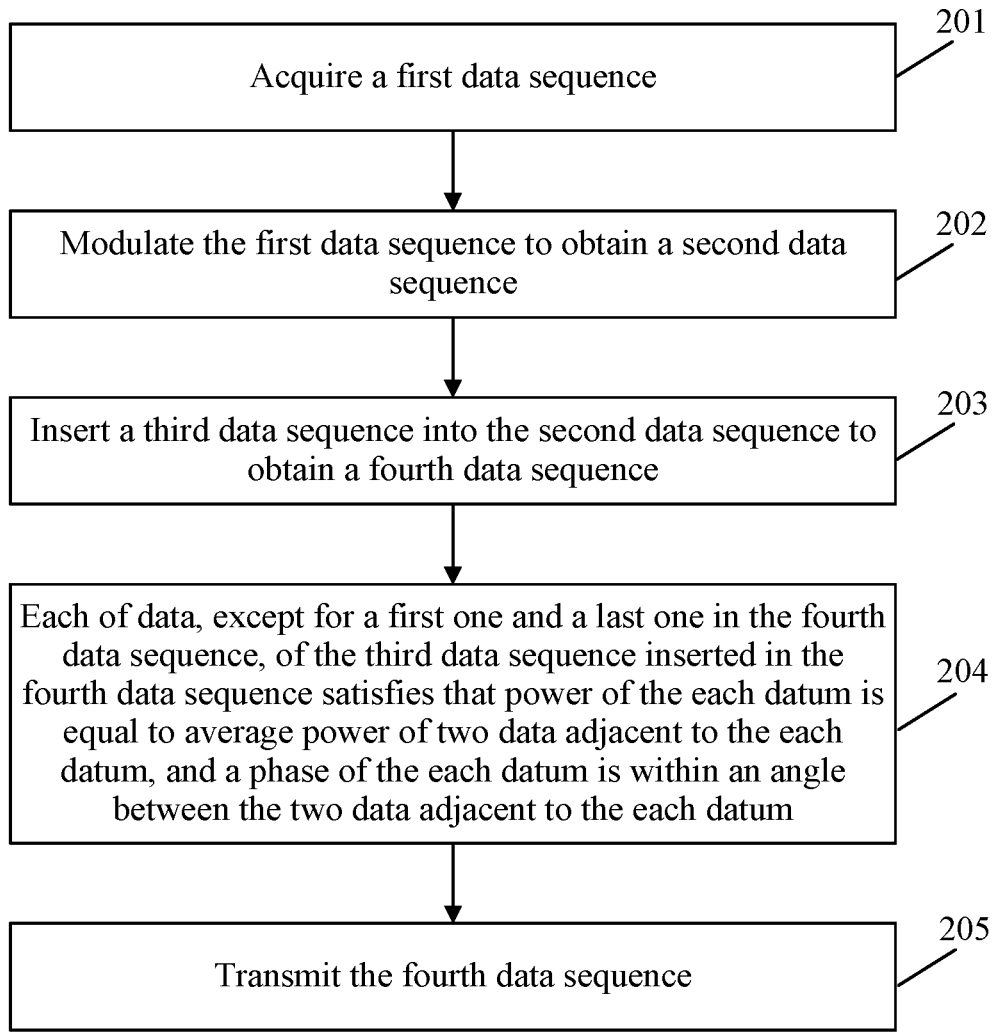
FIG. 2 is a flowchart of a method in the present embodiment.

A data modulation method according to an embodiment of the present application, as shown in FIG. 2, the method includes steps described below.

In step 201, a first data sequence is acquired. The processing before the first data sequence is inputted into a modulation module generally includes acquiring the first data sequence. Alternatively, a process of inputting the first data sequence into the modulation module is referred to as the acquisition of the first data sequence.

In step 202, the first data sequence is modulated to obtain a second data sequence.

The first data sequence may be modulated through constellation point modulation or other modulation such as inverse discrete Fourier transform (IDFT) processing.

In step 203, a third data sequence is inserted into the second data sequence to obtain a fourth data sequence.

In step 204, each of data, except for a first one and a last one in the fourth data sequence, of the third data sequence inserted in the fourth data sequence satisfies that power of the each datum is equal to average power of two data adjacent to the each datum, and a phase of the each datum is within an angle between the two data adjacent to the each datum.

In step 205, the fourth data sequence is transmitted.

In an implementation of the embodiment of the present application, the first data sequence [b(m)] may be composed of 0 and 1 or composed of 1 and −1, and the first data sequence is modulated, for example, the constellation point modulation is performed, so that the second data sequence such as a data sequence [x(i)] may be obtained after the constellation point modulation. A first datum x(i) and a second datum x(i+1), which are adjacent to each other, are extracted from the second data sequence. For example, a third datum y(j) is inserted between (all or part of pairs of) the first datum x(i) and the second datum x(i+1) which are adjacent to each other in the data sequence [x(i)]. Power of y(j) is equal to average power of x(i) and x(i+1), and a phase of y(j) is within an angle between x(i) and x(i+1). After the third data sequence such as [y(j)] is inserted, the fourth data sequence [s(k)] may be obtained. Data are modulated through constellation points for the time domain, and a datum is inserted between adjacent modulated data in the time domain. Since the inserted data are associated with adjacent modulated data, for example, the power of y(j) is equal to the average power of x(i) and x(i+1) and the phase of y(j) is within the angle between x(i) and x(i+1), therefore, the PAPR of transmitted signals can be reduced accordingly.

It is to be pointed out that in the fourth data sequence, remaining inserted data except for the original second data sequence constitute the third data sequence. In a coordinate system of constellation points, a phase difference is a difference in phase between two data. In the present application, two phase differences with a difference of $2n\pi$ are regarded as a same phase difference, where n is an integer. A phase value of a datum is a phase difference between the datum and a reference coordinate. In the present application, an angle between two data is an angular spatial range formed by lines from an origin respectively to the data, and a value of the angle is an angular value of the angle. In the present application, the value of the angle ranges within $[0, \pi]$. One difference between the phase difference and the value of the angle lies in that if a phase difference between datum A and datum B is $\theta$, a phase difference between datum B and datum A is $-\theta$; if a value of an angle between datum A and datum B is $\theta$, a value of an angle between datum B and datum A is also $\theta$.

In an implementation of the embodiment of the present application, for the inserted third data sequence such as [y(j)], that the phase of the each datum is within the angle between the two data adjacent to the each datum refers to that the each datum has a same value of angles respectively with the two data adjacent to the each datum.

In an implementation of the embodiment of the present application, for each inserted datum in the fourth data sequence, a modulus of each datum is equal to an average modulus of two data adjacent to the each datum. When each datum in the second data sequence has the same power, that the modulus of each inserted datum is equal to the average modulus of two data adjacent to the each inserted datum is equivalent to that the power of the each inserted datum is equal to the average power of two data adjacent to the each inserted datum.

In an implementation of the embodiment of the present application, an angle between the third datum and the first datum has a same value as an angle between the third datum and the second datum. For example, the third data sequence such as [y(j)] is inserted between (all or part of pairs of) x(i) and x(i+1) which are adjacent to each other in the data sequence [x(i)]. The power of y(j) is equal to the average power of x(i) and x(i+1), and the phase of y(j) is within the angle between x(i) and x(i+1). Besides, an angle between y(j) and x(i) has a same value as an angle between y(j) and x(i+1). Since each inserted datum has the phase within the angle between the two adjacent modulated data, and the angles between the inserted datum and the two modulated data have the same value, therefore, a demodulation signal-to-noise ratio can be increased, further reducing the PAPR significantly.

It is to be pointed out that the step in which the third data sequence is inserted into the second data sequence includes inserting the third data sequence into pairs of adjacent data in the second data sequence. For example, data may be inserted between all pairs of adjacent data in the second data sequence, or data are inserted between the part of pairs of adjacent data in the second data sequence.

When the second data sequence is [x(i)], the method further includes steps described below, data x(i) and x(i+1) are acquired from [x(i)], where i=0, 1, . . . , N−2, N−1, and each pair of adjacent data in x(0) and x(1), x(1) and x(2), x(2) and x(3), . . . , x(N−1) and x(N), and x(N) and x(0) is acquired. x(N) and x(0) may or may not be adjacent to each other. That is, x(N) and x(0) may or may not be included in all pairs of adjacent data.

1. When the third datum y(j) is inserted between the first datum x(i) and the second datum x(i+1) in [x(i)], the first datum and the second datum are adjacent to each other, the step in which the data are inserted between each pair of all pairs of the adjacent data includes inserting the third datum y(j) into a first data pair constructed by each pair of all pairs of adjacent data.

2. When the third datum y(j) is inserted between the first datum x(i) and the second datum x(i+1) in [x(i)], the first datum and the second datum are adjacent to each other, the step in which the data are inserted between part of pairs of adjacent data includes selecting the part of pairs of adjacent data from all the pairs of adjacent data and inserting the third datum y(j) into a second data pair constructed by the selected part of pairs of adjacent data.

Figure 3:
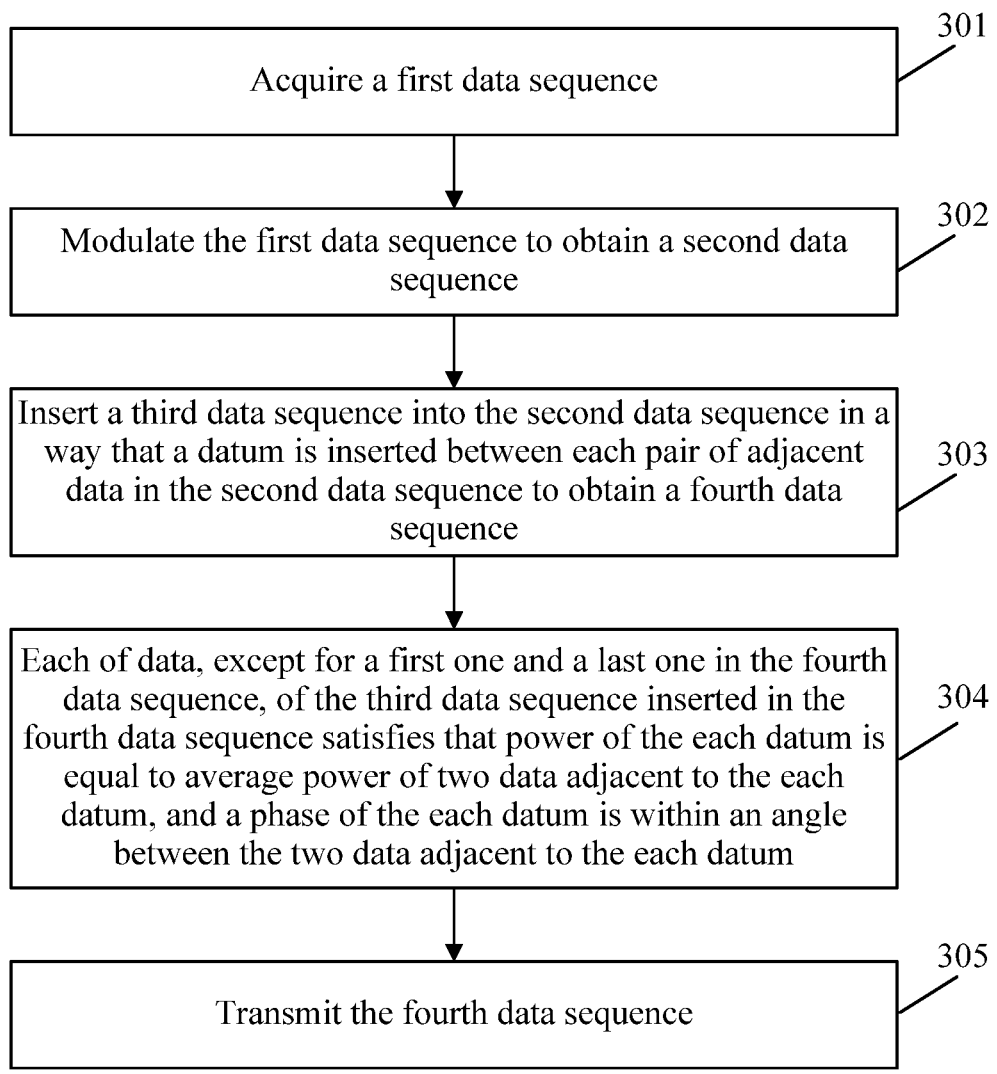
FIG. 3 is a flowchart of another method in the present embodiment.

A data modulation method according to an embodiment of the present application, as shown in FIG. 3, the method includes steps described below.

In step 301, a first data sequence is acquired.

In step 302, the first data sequence is modulated to obtain a second data sequence.

The first data sequence may be modulated through the constellation point modulation or other modulation such as the IDFT processing.

In step 303, a third data sequence is inserted into the second data sequence in a way that data are inserted between all pairs of adjacent data in the second data sequence, so that a fourth data sequence is obtained.

For example, y(j) is inserted between all pairs of x0 and x1, x1 and x2, x2 and x3, x3 and x4, . . . , and x(i) and x(i+1). In this insertion manner, each inserted datum is associated with modulated data adjacent to the each inserted datum, so that the PAPR of transmitted signals can be reduced accordingly. It is to be pointed out that one or more data may be inserted between two adjacent data in the second data sequence. The above example is an embodiment for inserting y(j) which is one datum between x(i) and x(i+1). In this embodiment, if y(J−1) is also inserted between x(N−1) and x(0), then J=N, that is, the number of elements in the second data sequence is the same as the number of elements in the third data sequence. In this embodiment, if no datum is inserted between x(N−1) and x(0), then J=N−1, that is, the second data sequence includes one more element than the third data sequence.

In step 304, each of data, except for a first one and a last one in the fourth data sequence, of the third data sequence inserted in the fourth data sequence satisfies that power of the each datum is equal to average power of two data adjacent to the each datum, and a phase of the each datum is within an angle between the two data adjacent to the each datum.

In step 305, the fourth data sequence is transmitted.

Figure 4:
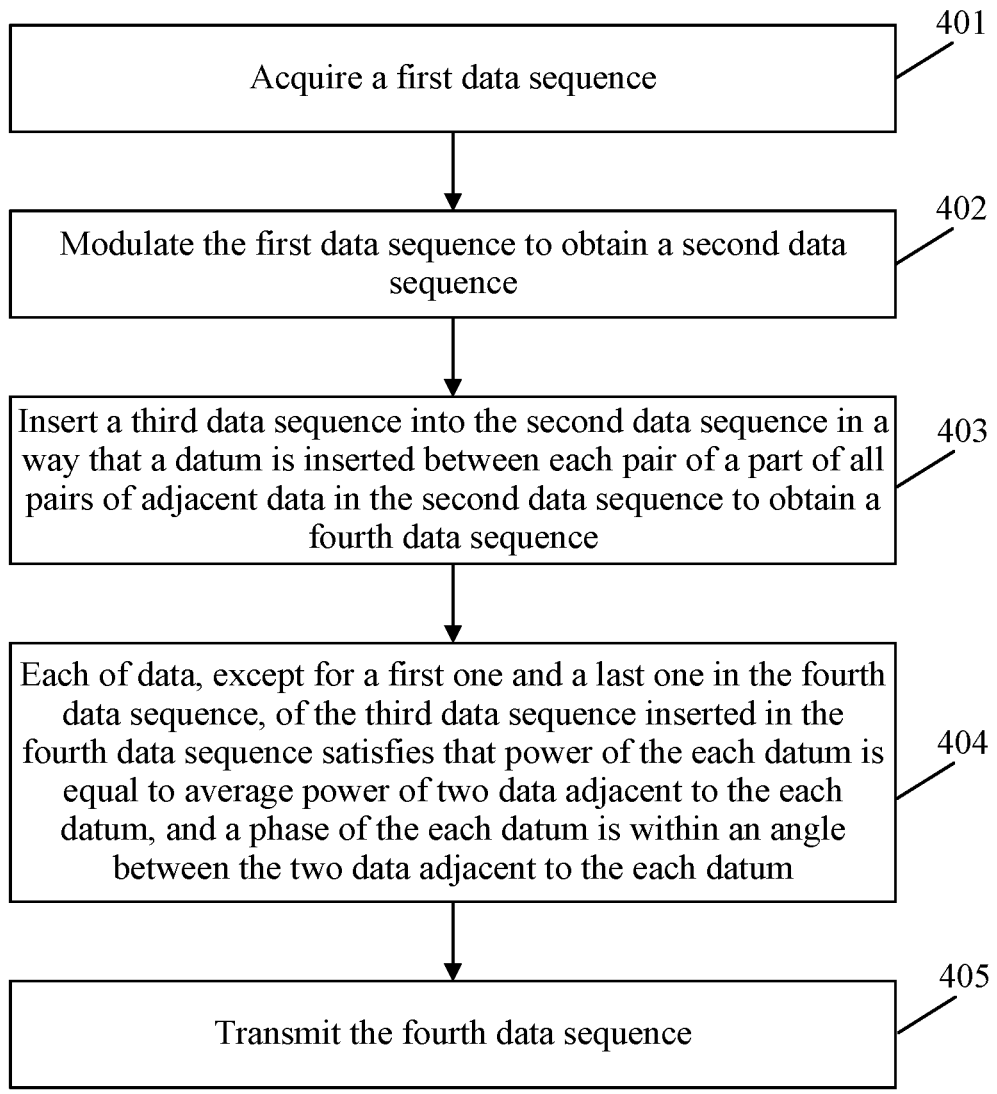
FIG. 4 is a flowchart of another method in the present embodiment.

A data modulation method according to an embodiment of the present application, as shown in FIG. 4, the method includes steps described below.

In step 401, a first data sequence is acquired.

In step 402, the first data sequence is modulated to obtain a second data sequence.

The first data sequence may be modulated through the constellation point modulation or other modulation such as the inverse discrete Fourier transform (IDFT) processing.

In step 403, a third data sequence is inserted into the second data sequence in a way that data are inserted between part of pairs of adjacent data in the second data sequence, and a fourth data sequence is obtained.

For example, y(j) is inserted between x1 and x2, y(j) is not inserted between x2 and x3, y(j) is inserted between x3 and x4, . . . , and y(j) is not inserted between x(i) and x(i+1). That is, a third datum such as [y(j)] is inserted between the part of pairs of adjacent data x(i) and x(i+1) in the data sequence [x(i)]. In this manner, each inserted datum is associated with adjacent modulated data, so that the PAPR of transmitted signals can be reduced accordingly. It is to be pointed out that one or more data may be inserted between two adjacent data in the second data sequence.

In step 404, each of data, except for a first one and a last one in the fourth data sequence, of the third data sequence inserted in the fourth data sequence satisfies that power of the each datum is equal to average power of two data adjacent to the each datum, and a phase of the each datum is within an angle between the two data adjacent to the each datum.

In step 405, the fourth data sequence is transmitted.

In an implementation of the embodiment of the present application, the step in which the fourth data sequence is transmitted includes transmitting the fourth data sequence carried on a physical time-frequency resource. In one embodiment, a data sequence [s(k)] carried on the physical time-frequency resource is transmitted. After the data sequence [s(k)] is transmitted to a receiving end, the receiving end receives data including the data sequence [s(k)], obtains data including a data sequence [x(i)] by using a related detection algorithm such as maximum-ratio combination, and restores a data sequence [b(m)] through a decoding and constellation point demodulation module or other modules. Compared with a common modulation method, the present application adds only the detection algorithm of the maximum-ratio combination at the receiving end, and the increased complexity is relatively low. Moreover, when the data sequence is demodulated, data elements will not generate error propagation between each other. Although [s(k)] has a larger length than [x(i)] at a transmitting end for performing the data modulation, which means that more physical resources need to be occupied for transmission, the demodulation performance, the signal-to-noise ratio (SNR), of [s(k)] can be improved since the detection algorithm of the maximum-ratio combination may be adopted at the receiving end. This advantage can compensate for the loss in transmission efficiency. For example, when the length of [s(k)] is twice the length of [x(i)], double physical resources need to be occupied for transmission. At a low coding rate, the double physical resources occupied are equivalent to a gain loss of 3 dB. Since the detection algorithm of the maximum-ratio combination can be adopted at the receiving end, the SNR can increase gains by 3 dB to the maximum, which can almost compensate for the loss in transmission efficiency.

In an implementation of the embodiment of the present application, the first data sequence is a data sequence [b(m)] and the second data sequence is [x(i)]; and the step in which the third data sequence is inserted into the second data sequence includes inserting a third datum y(j) between all or part of pairs of a first datum x(i) and a second datum x(i+1) which are adjacent to each other in [x(i)] to form a data sequence [s(k)], and [s(k)] is the fourth data sequence. An angle between the first datum and the second datum has a value range of [0, π], and m, i, j and k are all non-negative integers. m is a non-negative integer from 0, 1, . . . , M−1, i is a non-negative integer from 0, 1, . . . , N−1, j is a non-negative integer from 0, 1, . . . , J−1, and k is a non-negative integer from 0, 1, . . . , K−1, where M, N, J and K are positive integers.

In an implementation of the embodiment of the present application, the step in which the third datum y(j) is inserted between all or part of pairs of the first datum x(i) and the second datum x(i+1) which are adjacent to each other in [x(i)] includes the following case: when i is a value from a data sequence $$\left[0, \ 1, \ \ldots \ , \ N-2\right], |y(j)|^2 = \frac{1}{2}(|x(i)|^2 + |x(i+1)|^2)$$

and $\phi(y(j))-\phi(x(i))=\phi(x(i+1))-\phi(y(j))$; where |•| is a modulo operator, $\phi(•)$ is an operator for a phase of a complex number, and N is the number of elements in the second data sequence [x(i)].

In an implementation of the embodiment of the present application, the step in which the third datum y(j) is inserted between all or part of pairs of the first datum x(i) and the second datum x(i+1), which are adjacent to each other in [x(i)] includes the following case: when i=N−1, and j=J−1, where N is the number of elements in the second data sequence [x(i)], and J is the number of elements in the third data sequence [y(j)]; the third datum y(J−1) satisfies that $$|y(J-1)|^2 = \frac{1}{2}(|x(N-1)|^2 + |x(0)|^2)$$

and φ(y(J−1))−φ(x(N−1))=φ(x(0))−φ(y(J−1)); where |⊇| is the modulo operator, and φ(•) is the operator for a phase of a complex number. Alternatively, the third datum y(J−1) is another value. That is, a value of y(J−1) is not limited.

No datum may be inserted between x(N−1) and x(0). In this implementation, the third datum such as datum y(J−1) is inserted between x(N−1) and x(0).

In an implementation of the embodiment of the present application, y(J−1) is placed at a first or last position of the fourth data sequence. That y(J−1) is placed at the first position of the fourth data sequence is equivalent to performing cyclic shift once when y(J−1) is placed at the last position of the fourth data sequence.

In an implementation of the embodiment of the present application, when the constellation point modulation performed on the first data sequence is π/2-BPSK, after the third datum y(j) is inserted between each pair of the first datum x(i) and the second datum x(i+1) which are adjacent to each other, a modulus of y(j) is equal to a modulus of a π/2-BPSK modulated datum, a phase of y(j) is within an angle between x(i) and x(i+1), and an angle between y(j) and x(i) and an angle between y(j) and x(i+1) each have a value of π/4.

In an implementation of the embodiment of the present application, when the constellation point modulation performed on the first data sequence is QPSK, after the third datum y(j) is inserted between all pairs of the first datum x(i) and the second datum x(i+1) adjacent to each other, the modulus of y(j) is equal to a modulus of a QPSK modulated datum, the phase of y(j) is within the angle between x(i) and x(i+1), and an angle between y(j) and x(i) has a same value as an angle between y(j) and x(i+1).

Figure 5:
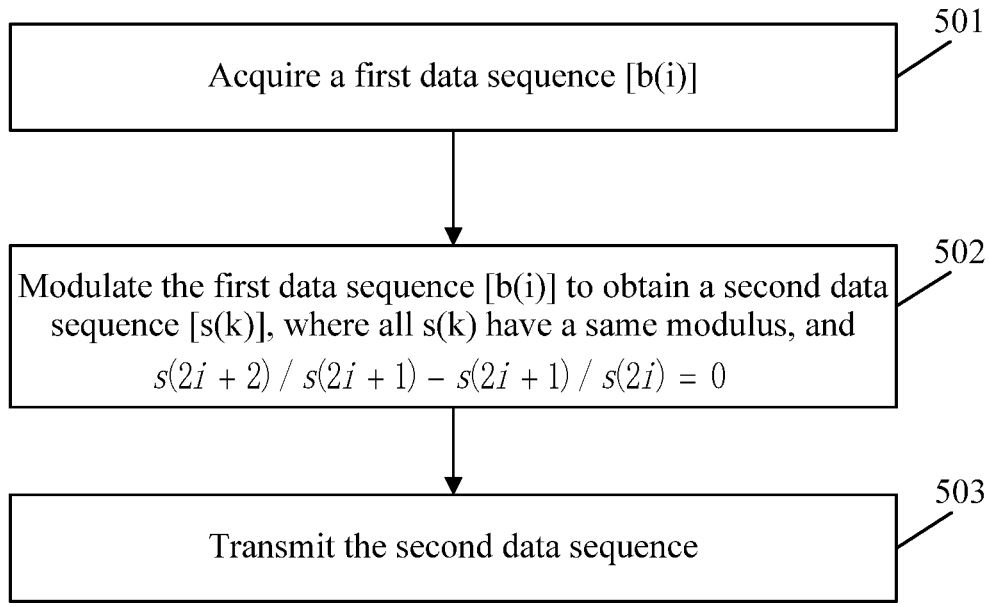
FIG. 5 is a flowchart of another method in the present embodiment.

A data modulation method according to an embodiment of the present application, as shown in FIG. 5, the method includes steps described below.

In step 501, a first data sequence [b(i)] is acquired.

In step 502, the first data sequence [b(i)] is modulated to obtain a second data sequence [s(k)], where all s(k) have a same modulus, and s(2i+2)/s(2i+1)−s(2i+1)/s(2i)=0.

i and k are both non-negative integers, i is a non-negative integer from 0, 1, . . . , N−1, and k is 0, 1, . . . , 2N−2 or k is a non-negative integer from 0, 1, . . . , 2N−1.

A modulation process in the embodiment of the present application may include the constellation point modulation and an insertion modulation. During an insertion modulation operation, one datum or no datum may be inserted between a last data element and a first data element of a data sequence subjected to the constellation point modulation. Therefore, a length of the data sequence [s(k)] may be 2N−1 or 2N, and a value of s(2N−1) is not limited in the embodiments of the present application.

In step 503, the second data sequence is transmitted.

In an implementation of the embodiment of the present application, the data sequence [b(i)] is composed of 0 and 1.

In an implementation of the embodiment of the present application, [s(k)] further has the following characteristic: an angle between s(k) and s(k+1) has a value of π/4.

In an implementation of the embodiment of the present application, [s(k)] further has the following characteristic: the angle between s(k) and s(k+1) has a value of 0, π/4 or π/2.

an implementation of the embodiment of the present application, [s(k)] further has the following characteristics: when $$k = 2i, s(k) = \frac{e^{j(\frac{\pi}{2}(i \bmod 2)+\theta)}}{\sqrt{2}}[(1-2b(i)) + j(1-2b(i))], \text{ or}$$

$$s(k) = \frac{e^{j(\frac{\pi}{2}i+\theta)}}{\sqrt{2}}[(1-2b(i)) + j(1-2b(i))];$$

when $k = 2i-1, s(k) = \frac{1}{\sqrt{2}}(s(k-1) + s(k+1))$, or $$s(k) = (s(k-1)s(k+1))^{\frac{1}{2}}.$$

i and k are both non-negative integers, i is a non-negative integer from 0, 1, . . . , N−1, k is 0, 1, . . . , 2N−2 or k is a non-negative integer from 0, 1, . . . , 2N−1, N is a positive integer, and θ is a preset constant.

In an implementation of the embodiment of the present application, [s(k)] further has the following characteristics: when $$k = 2i, s(k) = \frac{e^{j\theta}}{\sqrt{2}}[(1-2b(2i)) + j(1-2b(2i+1))];$$

when k=2i−1, s(k)=(s(k−1)s(k+1))^{1/2}.

i and k are both non-negative integers, i is a non-negative integer from 0, 1, . . . , N−1, k is 0, 1, . . . , 2N−2 or k is a non-negative integer from 0, 1, . . . , 2N−1, N is a positive integer, and θ is a preset constant.

Figure 6:
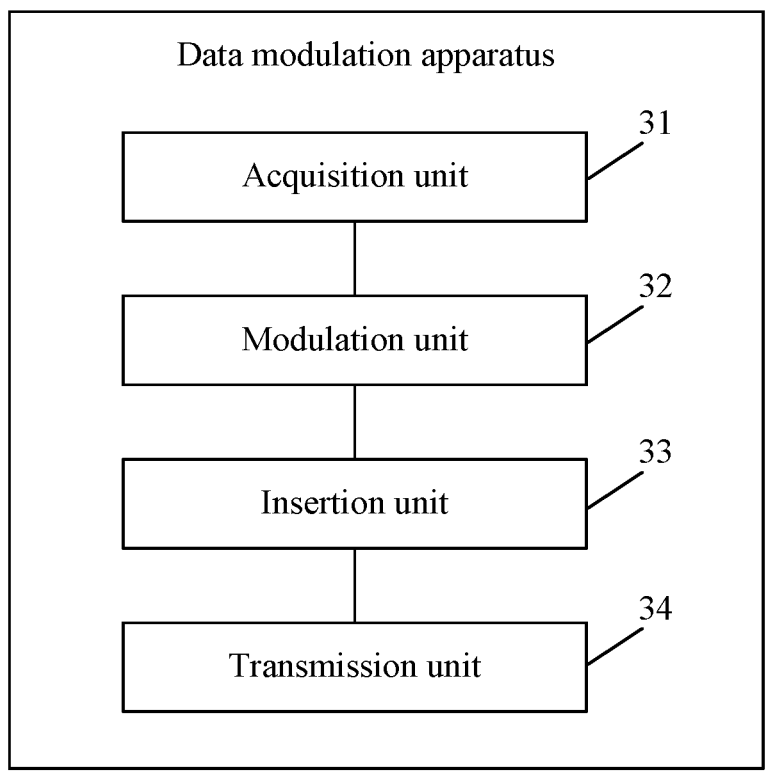
FIG. 6 is a structural diagram of an apparatus composed of units in the present embodiment.

A data modulation apparatus according to an embodiment of the present application, as shown in FIG. 6, the apparatus includes an acquisition unit 31, a modulation unit 32, an insertion unit 33 and a transmission unit 34. The acquisition unit 31 is configured to acquire a first data sequence. The modulation unit 32 is configured to modulate the first data sequence to obtain a second data sequence. The insertion unit 33; where each of data, except for a first one and a last one in the fourth data sequence, of the third data sequence inserted in the fourth data sequence satisfies that power of the each datum is equal to average power of two data adjacent to the each datum, and a phase of the each datum is within an angle between the two data adjacent to the each datum. The transmission unit 34 is configured to transmit the fourth data sequence.

It is to be understood by those skilled in the art that the implementation of functions of various units of the apparatus in FIG. 6 may be understood with reference to the related description of the preceding signal sending method. The functions of the various units of the apparatus in FIG. 6 may be implemented by programs running on a processor or by a logic circuit. In practical applications, the functions implemented by the various units of the data modulation apparatus may all be implemented by a central processing unit (CPU), a micro processor unit (MPU), a digital signal processor (DSP), a field-programmable gate array (FPGA) or the like located in the data modulation apparatus.

In an implementation of the embodiment of the present application, that the phase of the datum is within the angle between the two adjacent data refers to that the each datum has a same value of angles respectively with the two data adjacent to the each datum.

In an implementation of the embodiment of the present application, the modulation unit is further configured to modulate the first data sequence by performing a constellation point modulation on the first data sequence.

In an implementation of the embodiment of the present application, the insertion unit is further configured to insert data between all pairs of adjacent data in the second data sequence, or, insert data between part of pairs of the adjacent data in the second data sequence.

In an implementation of the embodiment of the present application, the transmission unit is further configured to transmit the fourth data sequence carried on a physical time-frequency resource.

In an implementation of the embodiment of the present application, the insertion unit is further configured to: when the first data sequence is a data sequence [b(m)] and the second data sequence is [x(i)], insert a third datum y(j) between each pair of all or part of pairs of a first datum x(i) and a second datum x(i+1) in [x(i)] to form a data sequence [s(k)], where the first datum and the second datum are adjacent to each other, and [s(k)] is the fourth data sequence. An angle between the first datum and the second datum has a value range of [0, π], where m, i, j and k are all non-negative integers.

In an implementation of the embodiment of the present application, the insertion unit is further configured to determine that, when i is a value from a data sequence [0, 1, . . . , N−2], $$|y(J-1)|^2 = \frac{1}{2}(|x(N-1)|^2 + |x(0)|^2)$$

and φ(y(j))−φ(x(i))=φ(x(i+1))−φ(y(j)); where |•| is a modulo operator, φ(•) an operator for a phase of a complex number, and N is the number of elements in the second data sequence [x(i)].

In an implementation of the embodiment of the present application, the insertion unit is further configured to determine that, when i=N−1, and j=J−1. where N is the number of elements in the second data sequence [x(i)], and J is the number of elements in the third data sequence [y(j)]; the third datum y(J−1) satisfies that $$|y(j)|^2 = \frac{1}{2}(|x(i)|^2 + |x(i+1)|^2)$$

and φ(y(J−1))−φ(x(N−1))=φ(x(0))−φ(y(J−1)), where |•| is the modulo operator and φ(•) is the operator for a phase of a complex number. Alternatively, the third datum y(J−1) is another value. That is, a value of y(J−1) is not limited.

No datum may be inserted between x(N−1) and x(0). In this implementation, the third datum such as datum y(J−1) is inserted between x(N−1) and x(0).

The insertion unit is further configured to place y(J−1) at a first or last position of the fourth data sequence. That y(J−1) is placed at the first position of the fourth data sequence is equivalent to performing cyclic shift once when y(J−1) is placed at the last position of the fourth data sequence.

In an implementation of the embodiment of the present application, the insertion unit is further configured to: when the constellation point modulation performed on the first data sequence is π/2-BPSK, insert the third datum y(j) between each pair of the first datum x(i) and the second datum x(i+1) which are adjacent to each other; where a modulus of y(j) is equal to a modulus of a π/2-BPSK modulated datum, the phase of y(j) is within the angle between x(i) and x(i+1), and an angle between y(j) and x(i) and an angle between y(j) and x(i+1) each have a value of π/4. The data sequence [s(k)] carried on the physical time-frequency resource for transmission is obtained after y(j) is inserted.

In an example, when the constellation point modulation is the π/2-BPSK, the following scheme is designed: a data sequence [b(i)] composed of 0 and 1 is modulated to obtain the data sequence [s(k)]. [s(k)] has the following characteristics: when $$k = 2i, s(k) = \frac{e^{j(\frac{\pi}{2}(i\bmod 2)+\theta)}}{\sqrt{2}}[(1-2b(i)) + j(1-2b(i))], \text{ or}$$

$$s(k) = \frac{e^{j(\frac{\pi}{2}i+\theta)}}{\sqrt{2}}[(1-2b(i)) + j(1-2b(i))];$$

when $k = 2i-1, s(k) = \frac{1}{\sqrt{2}}(s(k-1)+s(k+1))$, or $$s(k) = (s(k-1)s(k+1))^{\frac{1}{2}}.$$

i and k are both non-negative integers (i is a non-negative integer from 0, 1, . . . , N−1, k is 0, 1, . . . , 2N−2, or k is a non-negative integer from 0, 1, . . . , 2N−1), N is a positive integer, and θ is a preset constant.

In an implementation of the embodiment of the present application, the insertion unit is further configured to: when the constellation point modulation performed on the first data sequence is QPSK, insert the third datum y(j) between each pair of the first datum x(i) and the second datum x(i+1) which are adjacent to each other; where the modulus of y(j) is equal to a modulus of a QPSK modulated datum, the phase of y(j) is within the angle between x(i) and x(i+1), and the angle between y(j) and x(i) has the same value as the angle between y(j) and x(i+1). The data sequence [s(k)] carried on the physical time-frequency resource for transmission is obtained after y(j) is inserted.

In an example, when the constellation point modulation is the QPSK, the following scheme is designed: the data sequence [b(i)] composed of 0 and 1 is modulated to obtain the data sequence [s(k)]. [s(k)] has the following characteristics: when $$k = 2i, s(k) = \frac{e^{j\theta}}{\sqrt{2}}[(1-2b(i)) + j(1-2b(2i+1))];$$

when $$k = 2i-1, s(k) = (s(k-1)s(k+1))^{\frac{1}{2}}.$$

i and k are both non-negative integers (i is a non-negative integer from 0, 1, . . . , N−1, k is 0, 1, . . . , 2N−2, or k is a non-negative integer from 0, 1, . . . , 2N−1), N is a positive integer, and θ is a preset constant.

A data modulation apparatus according to an embodiment of the present application includes a modulation unit. The modulation unit is configured to modulate a data sequence [b(i)] to obtain a data sequence [s(k)]. [s(k)] has the following characteristics: all s(k) have a same modulus, and s(2i+2)/s(2i+1)−s(2i+1)/s(2i)=0, and where i and k are both non-negative integers.

In an implementation of the embodiment of the present application, the data sequence [b(i)] is composed of 0 and 1.

In an implementation of the embodiment of the present application, [s(k)] further has the following characteristic: an angle between s(k) and s(k+1) has a value of π/4.

In an implementation of the embodiment of the present application, [s(k)] further has the following characteristic: the angle between s(k) and s(k+1) has a value of 0, π/4 or π/2.

In an implementation of the embodiment of the present application, [s(k)] further has the following characteristics: when $$k = 2i, s(k) = \frac{e^{j(\frac{\pi}{2}(i \bmod 2)+\theta)}}{\sqrt{2}}[(1-2b(i)) + j(1-2b(i))], \text{ or}$$

$$s(k) = \frac{e^{j(\frac{\pi}{2}i+\theta)}}{\sqrt{2}}[(1-2b(i)) + j(1-2b(i))];$$

$$\text{when } k = 2i-1, s(k) = \frac{1}{\sqrt{2}}(s(k-1) + s(k+1)), \text{ or}$$

$$s(k) = (s(k-1)s(k+1))^{\frac{1}{2}}.$$

i and k are both non-negative integers. θ is a preset constant.

In an implementation of the embodiment of the present application, [s(k)] further has the following characteristics: when $$k = 2i, s(k) = \frac{e^{j\theta}}{\sqrt{2}}[(1-2b(i)) + j(1-2b(2i+1))];$$

when k=2i−1, s(k)=(s(k−1)s(k+1))$^{1/2}$.

i and k are both non-negative integers. θ is a preset constant.

A data modulation apparatus according to an embodiment of the present application includes a memory storing a computer program and a processor configured to, when executing the computer program, implement the steps of the method in any one of the embodiments described above.

A computer storage medium according to an embodiment of the present application stores a computer program, when the computer program is executed by a processor to implement the steps of the method in any one of the embodiments described above.

Various application scenarios for the embodiments of the present application are described below.

With the embodiments of the present application, the constellation point modulation is performed on a data sequence [b(m)] composed of 0 and 1 to obtain a data sequence [x(i)], and a datum y(j) is inserted between each pair of part or all of pairs of adjacent elements x(i) and x(i+1) in the data sequence [x(i)], where power of y(j) is equal to average power of x(i) and x(i+1), a phase of y(j) is within an angle between x(i) and x(i+1), and an angle between y(j) and x(i) has a same value as an angle between y(j) and x(i+1). After [y(j)] is inserted into the data sequence [x(i)], a data sequence [s(k)] is formed. The data sequence [s(k)] carried on a physical time-frequency resource is transmitted. A receiving end receives data including the data sequence [s(k)], obtains data including the data sequence [x(i)] using a related detection algorithm such as the maximum-ratio combination, and restores the data sequence [b(m)] through a decoding and constellation point demodulation module or other modules.

It is to be pointed out that the data sequence [b(m)] may be composed of two element types: 0 and 1. Two element types, 1 and −1, may also constitute a data sequence [b'(m)]. The data sequence [b'(m)] may be transformed into the sequence composed of the two element types: 0 and 1 through, for example, a transformation formula of b'(m)=1−2b(m), and then the subsequent modulation processing is performed. Alternatively, [b'(m)] is directly processed by using a modulation manner subjected to corresponding transformation, achieving same effects.

The angle ranges within [0, π], and m, i and k are all non-negative integers(m is a non-negative integer from 0, 1, . . . , M−1, i is a non-negative integer from 0, 1, . . . , N−1, and k is a non-negative integer from 0, 1, . . . , K−1, where M, N and K are positive integers).

In the embodiments of the present application, the datum y(j) is inserted between each pair of the adjacent elements x(i) and x(i+1) in the data sequence [x(i)], which means that the datum y(j) is inserted between each pair of all of pairs of adjacent elements x(i) and x(i+1) in the data sequence [x(i)], where K is 2N or 2N−1.

A description is provided below using a data formula: the constellation point modulation is performed on the data sequence [b(m)] composed of 0 and 1 to obtain the data sequence [x(i)], and the datum y(j) is inserted between each pair of all pairs of x(i) and x(i+1) which are adjacent to each other, where y(j) satisfies the following characteristics: when $$i = 0, 1, \ldots, N-2, |y(j)|^2 = \frac{1}{2}(|x(i)|^2 + |x(i+1)|^2)$$

and φ(y(j))−φ(x(i))=φ(x(i+1))−φ(y(j)); where |•| is a modulo operator, φ(•) is an operator for a phase of a complex number, and N is the number of elements in the second data sequence [x(i)].

When i=N−1, y(N−1) is not inserted, or another value is inserted, or other possible cases exist, which is described as follows: when i=N−1, and j=J−1; where N is the number of elements in the second data sequence [x(i)], and J is the number of elements in the third data sequence [y(j)]; the third datum y(J−1) satisfies that $$|y(J-1)|^2 = \frac{1}{2}(|x(N-1)|^2 + |x(0)|^2)$$

and φ(y(J−1))−φ(x(N−1))=φ(x(0))−φ(y(J−1)); where |•| is the modulo operator, and φ(•) is the operator for a phase of a complex number. Alternatively, the third datum y(J−1) is another value. That is, a value of y(J−1) is not limited.

After [y(j)] is inserted into the data sequence [x(i)], the data sequence [s(k)] is formed.

m, i and k are all non-negative integers(m is a non-negative integer from 0, 1, . . . , M−1, i is a non-negative integer from 0, 1, . . . , N−1, and k is 0, 1, . . . , 2N−2, or k is a non-negative integer from 0, 1, . . . , 2N−1), where M and N are positive integers.

In the embodiments of the present application, phase differences with a difference of 2nπ are regarded as a same phase difference, and n is an integer.

In the embodiments of the present application, the constellation point modulation includes π/2-BPSK, BPSK, QPSK, π/4-QPSK, 16QAM, 64QAM, 256QAM, etc. A relationship between M and N is related to the constellation point modulation. For example, when the constellation point modulation is the π/2-BPSK or BPSK, M=N; when the constellation point modulation is QPSK or π/4-QPSK, M=2N. In particular, when the constellation point modulation is the π/2-BPSK, BPSK, QPSK or π/4-QPSK, that the angle between y(j) and x(i) has the same value as the angle between y(j) and x(i+1) is equivalent to that a Euclidean distance between y(j) and x(i) is equal to a Euclidean distance between y(j) and x(i+1).

Further, when a value of the phase difference is limited to be in a range of (−π, π], |φ(y(i))−φ(x(i))|=|φ(x(i+1))−φ(y(i))|=½|φ(x(i+1))−φ(x(i))|.

Different constellation point modulation schemes are described below.

1. When the constellation point modulation is the π/2-BPSK, reference may be made to a scheme described below.

In step 601, a data sequence [b(i)] composed of 0 and 1 is modulated as follows to generate a data sequence [x(i)]:

$$x(i) = \frac{e^{j(\frac{\pi}{2}(i \bmod 2)+\theta)}}{\sqrt{2}}[(1-2b(i)) + j(1-2b(i))], \text{ or} \quad (1)$$

$$x(i) = \frac{e^{j(\frac{\pi}{2}i+\theta)}}{\sqrt{2}}[(1-2b(i)) + j(1-2b(i))]; \quad (2)$$

where i is a non-negative integer from 0, 1, ..., N−1, and N is a positive integer.

θ is a preset constant. In some embodiments, θ=0 or θ=−π/4.

In formulas (1) and (2), $$\frac{1}{\sqrt{2}}$$

is a power normalization factor and "j" denotes an imaginary part of a complex number.

In step 602, the data sequence [x(i)] is modulated as follows to generate a data sequence [s(k)]:

$$\text{when } k=2i, s(k)=x(i) \quad (3);$$

when $$k = 2i-1, s(k) = \frac{1}{\sqrt{2}}(s(k-1)+s(k+1)), \text{ or} \quad (4)$$

$$s(k) = (s(k-1)s(k+1))^{\frac{1}{2}}; \quad (5)$$

where i is a non-negative integer from 0, 1, ..., N−1, and k is 0, 1, ..., 2N−2, or k is a non-negative integer from 0, 1, ..., 2N−1. Results of s(k) generated through formulas (4) and (5) are equivalent (other formulas may also be included as long as the results are equivalent).

There are two possible cases for s(2N−1).
(1) s(2N−1) is not generated.

$$(2)\ s(2N-1)=(s(2N-2)s(0))^{1/2} \quad (6)$$

2. When the constellation point modulation is QPSK, reference may be made to a scheme described below.

In step 701, a data sequence [b(m)] composed of 0 and 1 is modulated as follows to generate a data sequence [x(i)]:

$$x(i) = \frac{e^{j\theta}}{\sqrt{2}}[(1-2b(2i)) + j(1-2b(2i+1))]; \quad (7)$$

where m is a non-negative integer from 0, 1, ..., M−1, i is a non-negative integer from 0, 1, ..., N−1, M and N are positive integers, and M=2N. θ is a preset constant. In some embodiments, θ=0 or θ=−π/4.

In step 702, the data sequence [x(i)] is modulated as follows to generate a data sequence [s(k)]:

$$\text{when } k=2i, s(k)=x(i) \quad (8);$$

$$\text{when } k=2i-1, s(k)=(s(k-1)s(k+1))^{1/2} \quad (9);$$

where i is a non-negative integer from 0, 1, ..., N−1, and k is 0, 1, ..., 2N−2, or k is a non-negative integer from 0, 1, ..., 2N−1. Results of s(k) generated through formulas (9) and (10) are equivalent (other formulas may also be included as long as the results are equivalent).

There are two possible cases for s(2N−1).
(1) s(2N−1) is not generated.

$$(2)\ s(2N-1)=(s(2N-2)s(0))^{1/2} \quad (10).$$

With the embodiments of the present application, when the constellation point modulation is performed on the data sequence [b(m)] composed of 0 and 1 to obtain the data sequence [x(i)], if a phase difference between x(i) and x(i+1) is α, a phase difference between adjacent data is decreased to α/2 after a datum y(j) is inserted between x(i) and x(i+1) which are adjacent to each other. The phase difference is decreased, so that compared with that of the data sequence [x(i)], a PAPR of a continuous analog signal outputted after the data sequence s(k) is processed by a digital-to-analog converter (DAC) is reduced. An example in which the constellation point modulation is the π/2-BPSK is used for further descriptions. The data sequence [x(i)] generated in step 301 has the following characteristics: (1) all data have an amplitude of 1, and (2) a phase difference between adjacent data is π/2. The data sequence [s(k)] generated in step 302 has the following characteristics: (1) all data have an amplitude of 1, and (2) a phase difference between adjacent data is π/4. Through step 302, the phase difference between adjacent data is decreased from π/2 to π/4, so that the PAPR of the continuous analog signal outputted after the data sequence s(k) is processed by the digital-to-analog converter (DAC) has been reduced. After receiving data including the data sequence [s(k)], a receiving end obtains data including the data sequence [x(i)] using a related detection algorithm such as the maximum-ratio combination.

Compared with a common modulation method, the modulation method of the present application adds only the detection algorithm of the maximum-ratio combination at the receiving end, and the increased complexity is relatively low. Moreover, when the data sequence [x(i)] is demodulated, data elements will not generate error propagation between each other.

In addition, though the length of [s(k)] is twice the length of [x(i)], which means that more physical resources need to be occupied for transmission, the demodulation performance, the signal-to-noise ratio (SNR), of [s(k)] can be improved by 3 dB since the detection algorithm of the maximum-ratio combination can be adopted at the receiving end. This advantage can compensate for the loss in transmission efficiency.

In a scenario one, the constellation point modulation is the π/2-BPSK.

Figure 7:
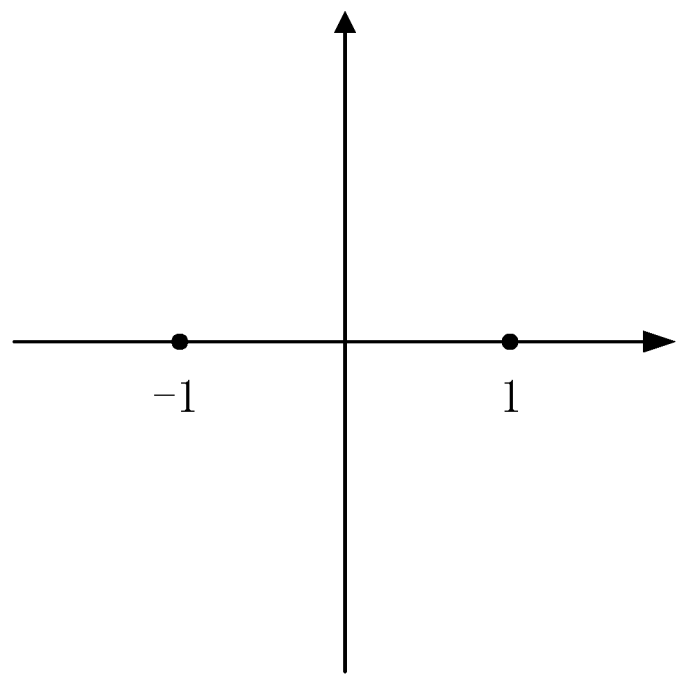
FIGS. 7 and 8 are diagrams of constellation points corresponding to a π/2-BPSK modulation manner of the present embodiment.
Figure 8:
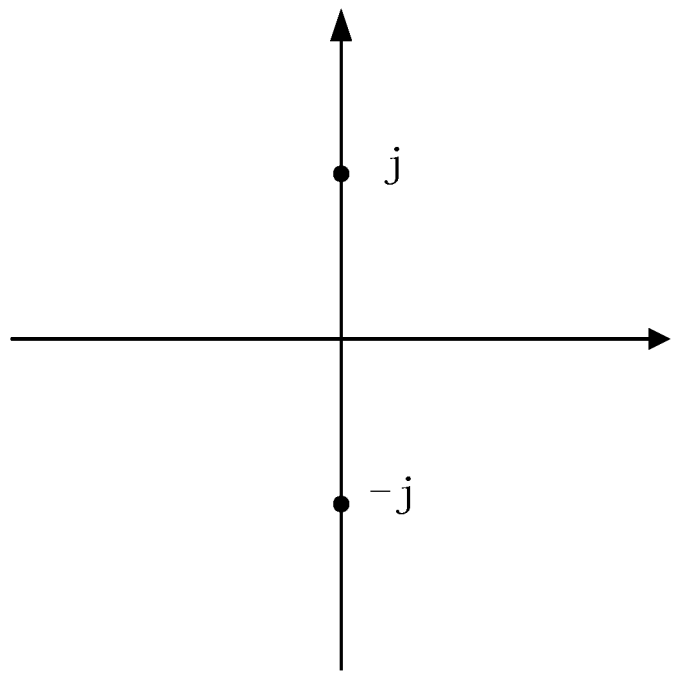

The data sequence [b(i)] composed of 0 and 1 is modulated through the π/2-BPSK to generate the data sequence [x(i)]. Assuming that the π/2-BPSK modulation is performed by using formula (1) and θ=−π/4, constellation points of the data sequence [x(i)] are shown in FIGS. 7 and 8. FIGS. 7 and 8 are diagrams of constellation points corresponding to the π/2-BPSK modulation manner. When i=0, 2, 4, . . . , that is, when i is an even number, x(i) is 1 or −1, and the constellation points are shown in FIG. 7. When i=1, 3, 5, . . . , that is, when i is an odd number, x(i) is j or −j, and the constellation points are shown in FIG. 8.

Figure 9:
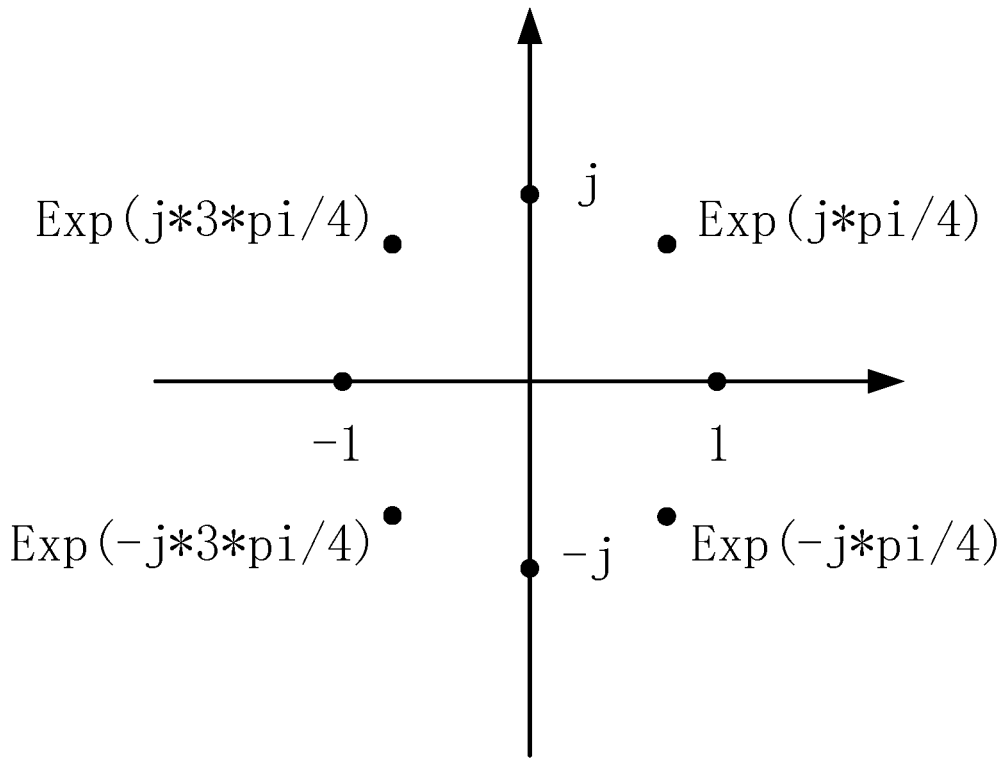
FIG. 9 is a diagram of constellation points of s(k) obtained in a π/2-BPSK modulation manner of the present embodiment.

The data sequence [x(i)] is modulated by using formulas (3) and (4) to generate the data sequence [s(k)], constellation points of which are shown in FIG. 9. FIG. 9 is a diagram of the constellation points of s(k). When k=2i, the constellation points of s(k) are located on real coordinates or imaginary coordinates in FIG. 9. When k=2i−1, the constellation points of s(k) are located in four quadrants in FIG. 9.

An example is described below.

If a binary data sequence [b(i)] to be transmitted is [0101101100], a symbol data sequence [x(i)] after the π/2-BPSK modulation is [1, −j, 1, −j, −1, j, −1, −j, 1, j]. It can be seen that the phase difference between adjacent symbols in the sequence [x(i)] is ±π/2. After [x(i)] is modulated by using formulas (3) and (4), the generated data sequence [s(k)] is [1, exp(−j*pi/4), −j, exp(−j*pi/4), 1, exp(−j*pi/4), −j, exp(−j*3 pi/4), −1, exp(j*3 pi/4), j, exp(j*3 pi/4), −1, exp(−j*3 pi/4), −j, exp(−j*pi/4), 1, exp(j*pi/4), j, exp(j*pi/4)]. Then the phase difference between two adjacent symbols in the symbol sequence is ±π/4. The phase difference is decreased, so that compared with that of the data sequence [x(i)], the PAPR of the continuous analog signal outputted after the data sequence s(k) is processed by the digital-to-analog converter (DAC) has been reduced. The last datum exp(j*pi/4) in the data sequence [s(k)] is calculated according to formula (6). The datum exp(j*pi/4) may not be inserted.

In a scenario two, the constellation point modulation is the QPSK and the data sequence [b(m)] is composed of 0 and 1.

Figure 10:
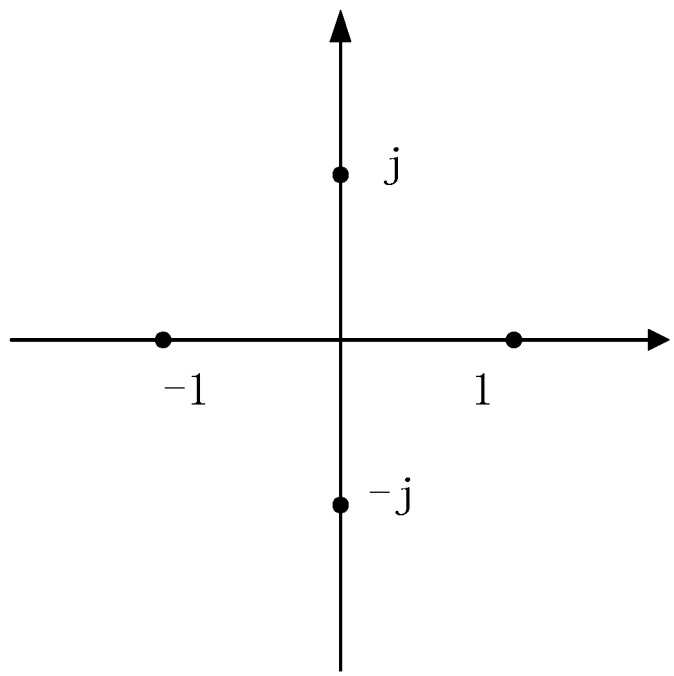
FIG. 10 is a diagram of constellation points for QPSK modulation of the present embodiment.

The data sequence [b(m)] composed of 0 and 1 is modulated through the QPSK to generate the data sequence [x(i)]. Assuming that QPSK modulation is performed using formula (7) and θ=−π/4, constellation points of the data sequence [x(i)] are shown in FIG. 10. FIG. 10 is a diagram of the constellation points for the QPSK modulation. x(i) is one of 1, −1, j or −j, and the constellation points are shown in FIG. 10.

Figure 11:
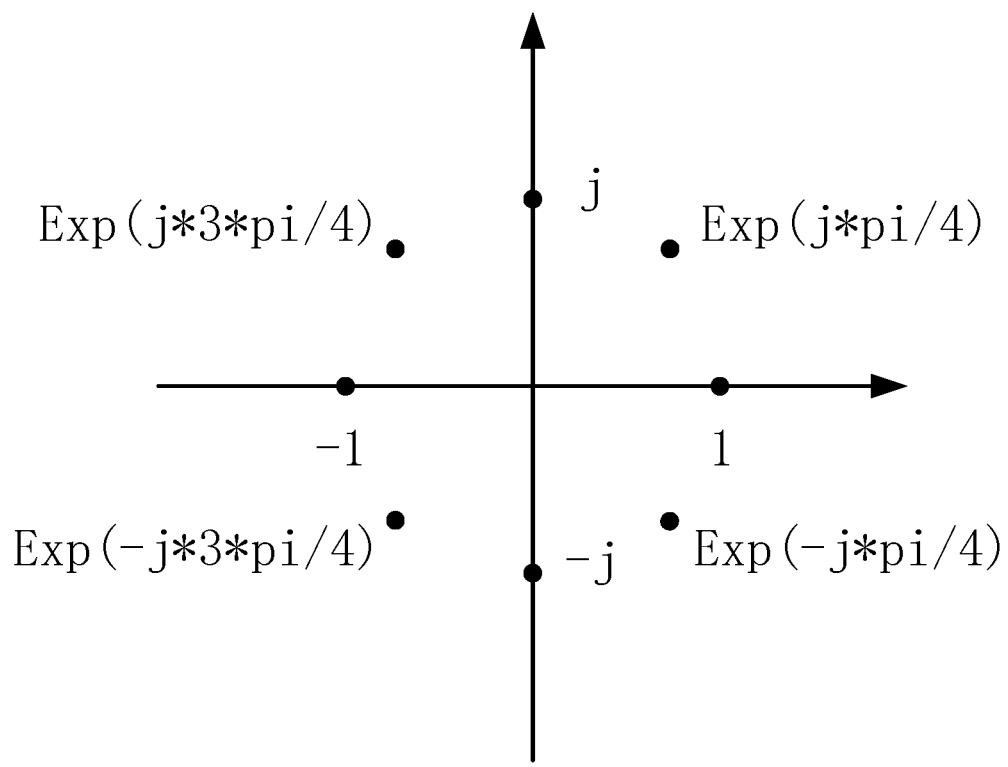
FIG. 11 is a diagram of constellation points of s(k) obtained in a QPSK modulation manner of the present embodiment.

The data sequence [x(i)] is modulated by using formulas (8) and (9) to generate the data sequence [s(k)], constellation points of which are shown in FIG. 11. FIG. 11 is a diagram of the constellation points of s(k). When k=2i, the constellation points of s(k) are located on real coordinates or imaginary coordinates in FIG. 11. When k=2i−1, the constellation points of s(k) are located in four quadrants in FIG. 11.

An example is described below.

If a binary data sequence [b(m)] to be transmitted is [0101101100], a symbol data sequence [x(i)] after the QPSK modulation is [−j, −j, j, −1, 1]. It can be seen that the phase difference between adjacent symbols in the sequence [x(i)] is one of 0, ±π/2, or π. After [x(i)] is modulated by using formulas (8) and (9), the generated data sequence [s(k)] is [−j, −j, −j, 1, j, exp(j*3pi/4), −1, −j, 1, exp(−j*pi/4)]. Then the phase difference between two adjacent symbols in the symbol sequence is one of 0, ±π/4, or ±π/2. The last datum exp(−j*pi/4) in the data sequence [s(k)] is calculated according to formula (10). The datum exp(−j*pi/4) may not be inserted.

In a scenario three, the constellation point modulation is the QPSK and the data sequence [b'(m)] is composed of 1 and −1.

The data sequence [b'(m)] composed of 1 and −1 is subjected to the QPSK modulation using a transformation manner of formula (7) to generate the data sequence [x(i)]. A transformation formula is b'(m)=1−2b(m), that is, formula (7) is transformed into the following formula:

$$x(i) = \frac{e^{j\theta}}{\sqrt{2}}[b'(2i) + jb'(2i+1)].$$

It can be seen that [b'(m)] is directly processed by using a modulation manner subjected to corresponding transformation, achieving same effects.

Assuming that θ=−π/4 is the above formula, x(i) is one of 1, −1, j, or −j, and the constellation points are shown in FIG. 10. The phase difference between adjacent symbols in the data sequence [x(i)] is one of 0, ±π/2, or 71 The data sequence [x(i)] is modulated by using formulas (8) and (9) to generate the data sequence [s(k)], and the phase difference between two adjacent symbols in the sequence [s(k)] is one of 0, ±π/4, or ±π/2.

The apparatus described above in the embodiments of the present disclosure may also be stored in a computer-readable storage medium if implemented in the form of software function modules and sold or used as an independent product. Based on this understanding, the schemes provided by the embodiments of the present application may be embodied in the form of a software product. The computer software product is stored in a storage medium and includes several instructions for enabling a computer device (which may be a personal computer, a server or a network device, etc.) to execute all or part of the methods provided by the various embodiments of the present application. The preceding storage medium includes a USB flash disk, a mobile hard disk, a read only memory (ROM), a magnetic disk, an optical disk or another medium capable of storing program codes. In this way, the embodiments of the present application are not limited to any particular combination of hardware and software.

Although the embodiments of the present application have been disclosed for illustrative purposes, those skilled in the art will appreciate that various modifications, additions and substitutions are possible, and accordingly, the scope of the present application should not be limited to the embodiments set forth above.

What is claimed is:
1. A data modulation method, comprising:
  modulating a first data sequence to obtain a second data sequence;
  inserting a third data sequence into the second data sequence to obtain a fourth data sequence; wherein each of data, except for a first one and a last one in the fourth data sequence, of the third data sequence in the fourth data sequence, satisfies that power of the each datum is equal to average power of two data adjacent to the each datum, and a phase of the each datum is within an angle between the two data adjacent to the each datum; and
  transmitting the fourth data sequence.

2. The method of claim 1, wherein that the phase of the each datum is within the angle between the two data adjacent to the each datum refers to that the each datum has a same value of angles respectively with the two data adjacent to the each datum.

3. The method of claim 1, wherein modulating the first data sequence comprises: performing a constellation point modulation on the first data sequence.

4. The method of claim 1, wherein inserting the third data sequence into the second data sequence comprises:
inserting data between all pairs of adjacent data in the second data sequence; or
inserting data between part of pairs of adjacent data in the second data sequence.

5. The method of claim 1, wherein transmitting the fourth data sequence comprises: transmitting the fourth data sequence carried on a physical time-frequency resource.

6. The method of claim 1, wherein the first data sequence is [b(m)] and the second data sequence is [x(i)]; and
wherein inserting the third data sequence into the second data sequence comprises:
inserting a third datum y(j) between each pair of all or part of pairs of a first datum x(i) and a second datum x(i+1) in [x(i)] to form a data sequence [s(k)], wherein the first datum and the second datum are adjacent to each other, [s(k)] is the fourth data sequence, an angle between the first datum and the second datum has a value range of [0, π], and m, i, j and k are non-negative integers.

7. The method of claim 6, wherein in a case where i is a value from a data sequence [0, 1, . . . , N−2], $$|y(j)|^2 = \frac{1}{2}(|x(i)|^2 + |x(i+1)|^2); \text{ and}$$

$$\phi(y(j)) - \phi(x(i)) = \phi(x(i+1)) - \phi(y(j));$$

wherein $|\cdot|$ is a modulo operator, $\phi(\cdot)$ is an operator for a phase of a complex number, and N is a number of elements in the second data sequence [x(i)];
wherein in a case where i=N−1, and j=J−1, the third datum y(J−1) satisfies that:

$$|y(J-1)|^2 = \frac{1}{2}(|x(N-1)|^2 + |x(0)|^2), \text{ and}$$

$$\phi(y(J-1)) - \phi(x(N-1)) = \phi(x(0)) - \phi(y(J-1));$$

wherein N is a number of elements in the second data sequence [x(i)], J is a number of elements in the third data sequence [y(j)], $|\cdot|$ is a modulo operator, and $\phi(\cdot)$ is an operator for a phase of a complex number; or
wherein the third datum y(J−1) is another value.

8. The method of claim 7, further comprising: acquiring data x(i) and x(i+1) from [x(i)], wherein i=0, 1, . . . , N−2, N−1; and acquiring each pair of adjacent data in x(0) and x(1), x(1) and x(2), x(2) and x(3), . . . , x(N−1) and x(N), and x(N) and x(0);
wherein inserting the third datum y(j) between each pair of all or part of pairs of the first datum x(i) and the second datum x(i+1) in [x(i)] comprises:
inserting the third datum y(j) into each pair of all the pairs of adjacent data; or
selecting the part of pairs of adjacent data from all the pairs of adjacent data, and inserting the third datum y(j) into each pair of the selected part of pairs of adjacent data.

9. The method of claim 7, wherein y(J−1) is at a first or last position of the fourth data sequence.

10. The method of claim 1, wherein in a case where a constellation point modulation is performed on the first data sequence and the constellation point modulation is π/2 binary phase shift keying (π/2-BPSK),
after a third datum y(j) is inserted between each pair of a first datum x(i) and a second datum x(i+1) which are adjacent to each other in the second data sequence, a modulus of y(j) is equal to a modulus of a π/2-BPSK modulated datum, a phase of y(j) is within an angle between x(i) and x(i+1), and an angle between y(j) and x(i) and an angle between y(j) and x(i+1) each have a value of π/4.

11. The method of claim 1, wherein in a case where a constellation point modulation is performed on the first data sequence and the constellation point modulation is quadrature phase shift keying (QPSK),
after a third datum y(j) is inserted between each pair of a first datum x(i) and a second datum x(i+1) which are adjacent to each other in the second data sequence, a modulus of y(j) is equal to a modulus of a QPSK modulated datum, a phase of y(j) is within an angle between x(i) and x(i+1), and an angle between y(j) and x(i) has a same value as an angle between y(j) and x(i+1).

12. A data modulation method, comprising:
modulating a data sequence [b(i)] to obtain a data sequence [s(k)]; wherein [s(k)] has the following characteristics:
all s(k) have a same modulus, and $$s(2i+2)/s(2i+1)-s(2i+1)/s(2i)=0;$$

wherein i and k are non-negative integers.

13. The method of claim 12, wherein the data sequence [b(i)] is composed of 0 and 1.

14. The method of claim 12, wherein [s(k)] further has a characteristic that an angle between s(k) and s(k+1) has a value of π/4.

15. The method of claim 12, wherein [s(k)] further has a characteristic that an angle between s(k) and s(k+1) has a value of 0, π/4 or π/2.

16. The method of claim 12, wherein [s(k)] further has the following characteristics:
in a case where k=2i, $$s(k) = \frac{e^{j(\frac{\pi}{2}(i \bmod 2)+\theta)}}{\sqrt{2}}[(1-2b(i))+j(1-2b(i))], \text{ or}$$

$$s(k) = \frac{e^{j(\frac{\pi}{2}i+\theta)}}{\sqrt{2}}[(1-2b(i))+j(1-2b(i))];$$

in a case where k=2i−1, $$s(k) = \frac{1}{\sqrt{2}}(s(k-1)+s(k+1)), \text{ or } s(k) = (s(k-1)s(k+1))^{\frac{1}{2}};$$

wherein i and k are non-negative integers, and θ is a preset constant.

17. The method of claim 12, wherein [s(k)] further has the following characteristics:

in a case where $$k = 2i, s(k) = \frac{e^{j\theta}}{\sqrt{2}}[(1 - 2b(2i)) + j(1 - 2b(2i + 1))];$$

in a case where k=2i−1, $s(k)=(s(k-1)s(k+1))^{1/2}$;

wherein i and k are non-negative integers, and θ is a preset constant.

18. A data modulation apparatus, comprising a processor and a memory, wherein the memory stores a computer program executable by the processor, and the computer program comprises:

a modulation unit, which is configured to modulate a data sequence [b(i)] to obtain a data sequence [s(k)]; wherein [s(k)] has the following characteristics:

all s(k) have a same modulus, and s(2i+2)/s(2i+1)−s(2i+1)/s(2i)=0;

wherein i and k are non-negative integers.

19. The apparatus of claim 18, wherein [s(k)] further has the following characteristics:

in a case where k=2i, $$s(k) = \frac{e^{j(\frac{\pi}{2}(i \bmod 2)+\theta)}}{\sqrt{2}}[(1 - 2b(i)) + j(1 - 2b(i))], \text{ or}$$

$$s(k) = \frac{e^{j(\frac{\pi}{2}i+\theta)}}{\sqrt{2}}[(1 - 2b(i)) + j(1 - 2b(i))];$$

in a case where k=2i−1, $$s(k) = \frac{1}{\sqrt{2}}(s(k-1) + s(k+1)), \text{ or } s(k) = (s(k-1)s(k+1))^{\frac{1}{2}};$$

wherein i and k are non-negative integers, and θ is a preset constant.

20. The apparatus of claim 18, wherein [s(k)] further has the following characteristics:

in a case where $$k = 2i, s(k) = \frac{e^{j\theta}}{\sqrt{2}}[(1 - 2b(2i)) + j(1 - 2b(2i + 1))];$$

in a case where k=2i−1, $s(k)=(s(k-1)s(k+1))^{1/2}$;

wherein i and k are non-negative integers, and θ is a preset constant.

\* \* \* \* \*